Figure 1:
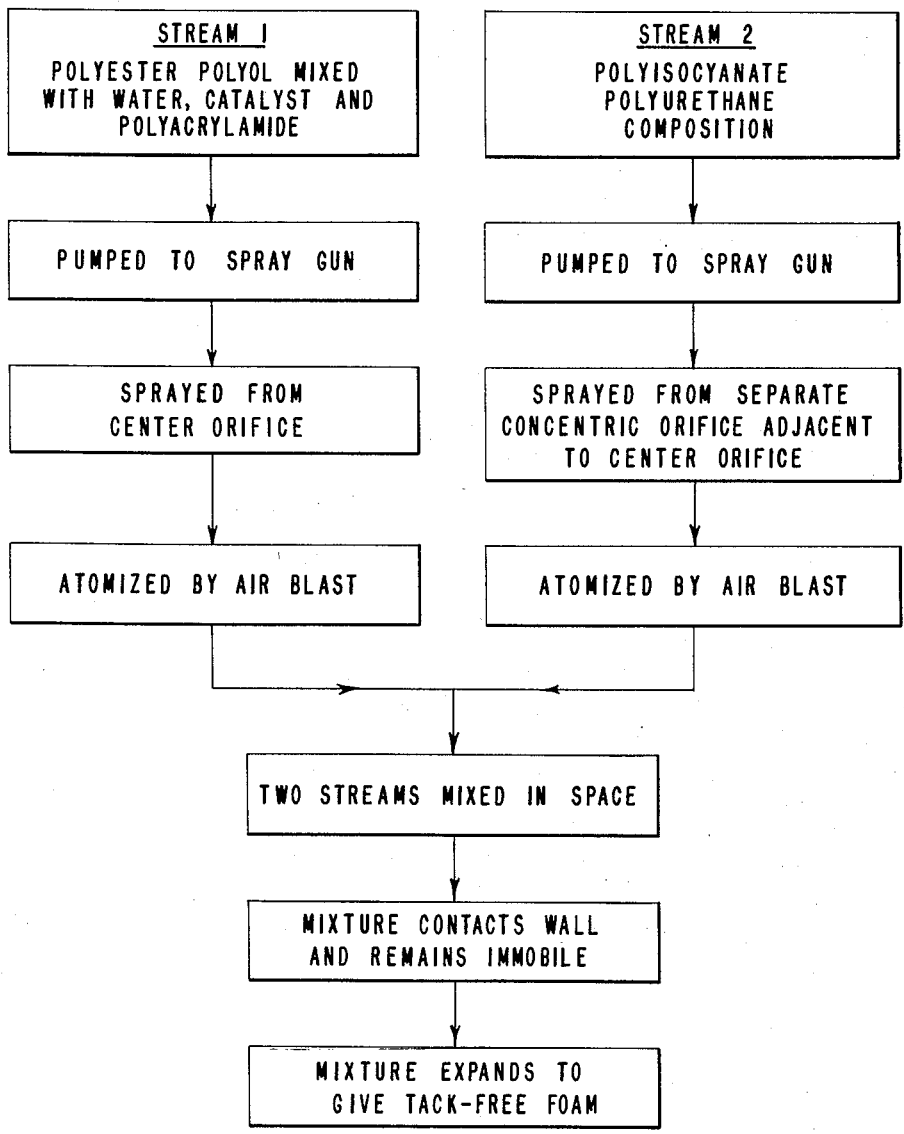

Oct. 4, 1960     S. R. FOSTER     2,955,058
SPRAY APPLICATION OF FOAMABLE POLYURETHANE MATERIALS
Filed Dec. 13, 1957     2 Sheets-Sheet 1

INVENTOR
SEYMOUR R. FOSTER

BY *Robert C. Kline*

ATTORNEY

Oct. 4, 1960  S. R. FOSTER  2,955,058
SPRAY APPLICATION OF FOAMABLE POLYURETHANE MATERIALS
Filed Dec. 13, 1957  2 Sheets-Sheet 2
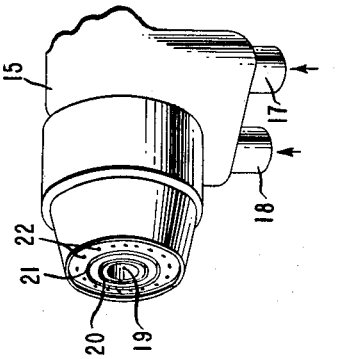
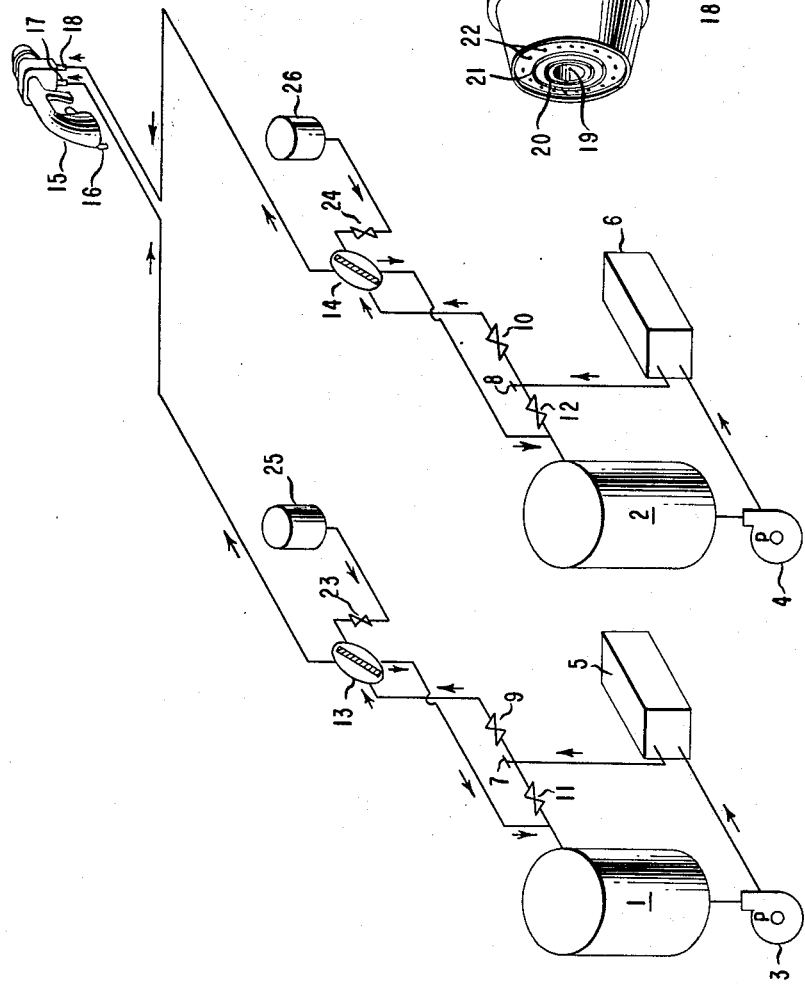
INVENTOR
SEYMOUR R. FOSTER
BY *Robert C. Kline*
ATTORNEY United States Patent Office 2,955,058
Patented Oct. 4, 1960

2,955,058
SPRAY APPLICATION OF FOAMABLE POLYURETHANE MATERIALS

Seymour R. Foster, Wilmington, Del., assignor to E. I. du Pont de Nemours and Company, Wilmington, Del., a corporation of Delaware Filed Dec. 13, 1957, Ser. No. 702,501

4 Claims. (Cl. 117—104)

This invention relates to a process for the spray application of foamable polyurethane materials, and more particularly to a process of spray-coating vertical or overhead surfaces with foamable polyurethane materials.

In recent years much attention has been paid to the technique of "foamed-in-place" insulation, involving the use of polyurethane foams. In this procedure cellular materials are formed by the reaction of water and a fluid polyisocyanate mixture, which may contain emulsifying agents, catalysts, fillers, and the like. The insulation is installed by pouring or spray-mixing the reactants into a cavity or by spraying them onto a surface or screen. This technique has several shortcomings, namely, the problem of cost and the problem of operating convenience. Often a mold of some sort is needed and when irregular shaped objects are being insulated, this involves a great expense due to the cost of preparing the required molds.

The use of a continuous spray applicator eliminates the need for forms or molds in that the foamable reaction mixture is applied directly to the surface. There it expands to give a cellular material. Although this method appears very attractive, serious problems arise which have heretofore prevented acceptance of spray-coating by the trade. Since there is no mold, the foaming material is unsupported. Until gelation has occurred to a sufficient extent to immobilize the mass, it tends to flow; hence when overhead surfaces are sprayed, the drainage causes loss of material and the formation of surface irregularities resembling stalactities. Spraying of vertical surfaces has been very difficult also. The newly applied material flows downward causing the development of rough, uneven surfaces and internal striations. Also, building-up of thick sections by means of successive spray passes has been inconvenienced by the time lost in waiting for the normal foaming reaction to expand the coating to full volume and to give the resultant foam sufficient mechanical strength to support an additional coat.

It is an object of the present invention to provide a process for the spray application of foamable polyurethane materials. A further object is to provide an improved process for the spray application of foamable polyurethane materials which is particularly suitable for treating vertical and overhead surfaces. Other objects will appear hereinafter.

These and other objects of this invention are accomplished by a process of forming a cellular polyurethane structure on a surface which comprises spraying separate streams of ingredients, which are mixed after leaving their respective orifices, said streams being (1) a stream comprising 100 parts by weight of a fluid polyester polyol having at least one hydroxyl group as a cross-linking site for each 400 units of molecular weight of said polyester, from 4.1 to 5.8 weight parts of water, and from 1.6 to 3.4 weight parts of a basic catalyst, said catalyst being selected from the group consisting of a tri lower alkyl amine, a mixture comprising said tri lower alkyl amine and sodium methyl siliconate, and a mixture comprising an amine of the structure, $R_2R'N$, wherein R is a lower alkyl radical and R' is lower alkyl radical substituted by a hydroxyl group, and sodium methyl siliconate; with the proviso that said polyester polyol stream contain from 1.6 to 5.0 parts of a water-soluble polyacrylamide having a Brookfield viscosity at 25° C. in 10% aqueous solution of from 8,000 to 20,000 centipoises and (2) a stream comprising a polyisocyanate polyurethane composition made by reacting an arylene diisocyanate with a polyester polyol having at least one hydroxyl group as a cross-linking site for each 400 units of molecular weight of polyester in relative amounts such that the number of isocyanate groups to the number of hydroxyl groups is in a ratio of about 5:1 to 7:1; with about 130 to 200 weight parts of said polyisocyanate polyurethane composition stream (2) being employed for each 100 parts by weight of said polyester polyol stream (1); with the proviso that the ratio of the number of isocyanate groups in said polyisocyanate stream to the number of hydroxyl groups in said polyester polyol stream is at least 1.25:1.

The improved spray application process of this invention, by providing a water-soluble polyacrylamide in the polyester polyol stream, makes it possible to apply a foamable polyurethane material to vertical or overhead surfaces. The presence of this additive keeps the newly sprayed material on the surfaces from flowing during the time when foaming is proceeding to a sufficient extent to immobilize the material on the surface.

The present invention may be illustrated with reference to the accompanying drawings in which Figure 1 is a flow sheet representing the various steps in the process of forming a cellular polyurethane structure on a surface;

Figure 2 is a diagram of a system which may be employed for carrying out the process of this invention; and Figure 3 is a side-front view of the spray gun nozzle which is used to spray the two streams of ingredients in the formation of the polyurethane cellular material.

Referring to Figure 2, tanks 1 and 2 are storage tanks for the fluid polyester polyol composition and the polyisocyanate polyurethane composition, respectively. The polyester polyol composition contains a polyester polyol, water, a catalyst and polyacrylamide. Pumps 3 and 4 at the base of these tanks circulate the materials through heat exchangers 5 and 6. The materials are circulated through the heat exchangers 5 and 6 into tanks 1 and 2 until the proper temperature is obtained as determined by temperature sensing elements 7 and 8, respectively. When circulating in this fashion, valves 9 and 10 are closed and valves 11 and 12 are open. After the proper temperature is reached, valves 11 and 12 are closed, valves 9 and 10 are opened and the materials are permitted to circulate through the lines and are then returned to the tanks. This is accomplished by actuating the four-way valves 13 and 14, respectively. In Figure 2 valves 13 and 14 are shown in the open position to permit the materials to pass on to the spray gun 15. However, when the materials are being circulated through the lines, these valves are turned about 45° so as to close off the lines to the gun and to permit the materials to be returned to the storage tanks. After the temperature of the lines stabilizes, valves 13 and 14 are positioned as shown in Figure 2 to permit the materials to pass on to the spray gun 15. Air enters the spray gun at 16 and the two streams of materials at 17 and 18. Figure 3 shows the nozzle portion of the spray gun. The two streams of reactants and air are passed through the spray gun and are introduced to the atmosphere through concentric orifices 19, 20 and 21, as shown in Figure 3. Mixing of the materials or reactants occurs beyond the gun. The polyester polyol stream emerges from the spray gun 15 from center orifice 19. The polyisocyanate polyurethane stream emerges from a concentric orifice 20 adjacent to orifice 19. An outer air blast from an outer concentric orifice 21 atomizes the emerging streams by creating areas of varying air density. A ring of air jets 22 about this outer orifice 21 completes the mixing.

When the spraying operation is being carried out and when the materials are being circulated through the lines prior to spraying, valves 23 and 24 are in a closed position. When the spraying operation is complete, valves 23 and 24 are opened and the four-way valves 13 and 14 are positioned so as to permit cleaning agents from tanks 25 and 26 to circulate through the lines.

In carrying out the improved process of the present invention, two separate streams of ingredients are used and these streams are mixed after leaving their respective orifices. The first of these streams is the polyester polyol stream which is made up of a polyester polyol, water, a basic catalyst, and the polyacrylamide. The polyester polyol is made by reacting a molar excess of an organic polyol with a dibasic carboxylic acid which is preferably saturated and has no functional groups, other than the carboxylic acid groups, containing active hydrogen atoms. Acids such as phthalic acid, terephthalic acid, isophthalic acid, succinic acid, glutaric acid, adipic acid, and pimelic acid are suitable. Anhydrides of these acids such as succinic anhydride, phthalic anhydride, maleic anhydride and fumaric anhydride may be used also. The polyol component or components of the polyester are preferably trihydric. Examples of suitable polyols are trimethylolethane, trimethylolpropane, mannitol, pentaerythritol, hexanetriol, and glycerine. Small amounts of dihydric alcohols such as ethylene glycol, diethylene glycol, 1,2-propylene glycol, 1,4-butanediol, and cyclohexane diol may also be used. It is recommended that no more than about 20% of the hydroxyl groups used be supplied by a diol in order to provide a rigid cellular material.

The polyester polyol is prepared by the usual methods of condensation polymerization. The reactants are agitated at a temperature between about 150 and 225° C. until the acid number of the mixture decreases to the desired value. A catalyst such as p-toluene sulfonic acid may be used but it is not necessary. During the condensation, water is evolved. When the reaction is completed, the mixture obtained should be heated briefly under reduced pressure to remove any water present. It is preferred that the water content of the polyester polyol not exceed about 0.1% by weight.

The polyester polyol should have a hydroxyl number of about 350–500; it is preferable that the acid number be 0.5 or less, but it may be as high as 5. There should be at least one cross-linking site in the form of a hydroxyl group for each 400 units of molecular weight so that the polyurethane foam prepared from this polyol will harden as quickly as possible. Hydroxyl groups are provided for this purpose by the triols used in preparing the polyester polyol. The polyester polyol should be fluid at room temperature for convenience of operation, but it may be used if it melts at about 40° C.

The polyester polyol stream should contain from about 4.1 to about 5.8 parts by weight of water for every 100 parts by weight of polyester polyol. This amount of water is used for reaction with isocyanate groups after the polyester polyol stream has been mixed with the polyisocyanate polyurethane composition stream, and this reaction provides the carbon dioxide gas needed to expand the mass and form a cellular material. In addition to the water, this polyester polyol stream should contain from about 1.6 to 3.4 parts by weight of a basic catalyst. The use of a catalyst is necessary in order to accelerate the formation of the cellular material and to promote its surface adhesion.

Lower trialkylamines are suitable catalysts. Representative examples are trimethylamine, triethylamine, tri-n-propylamine, tri-n-butylamine, dimethylethylamine, diethylmethylamine, dimethyl-n-propylamine, dimethyl-n-butylamine, and dimethylisobutylamine. Mixtures of these amines may be used. Triethylamine is the preferred trialkylamine. These amines may be used in combination with sodium methyl siliconate $CH_3Si(OH)_2ONa$, which is a very active catalyst. Lower trialkylamines containing one hydroxyl group per molecule, for example dimethylethanolamine, may be employed when in combination with sodium methyl siliconate. Other basic agents may be employed, optionally, in addition to the above catalysts. Potassium hydroxide, potassium acetate, and quaternary ammonium hydroxides are representative basic agents.

In addition to the above, the polyester polyol stream may contain other ingredients, such as non-ionic emulsifying agents, in order to improve the dispersion of the water, or water-soluble organo silicone polymers which will provide an improved cell structure. Representative examples of emulsifying agents are polyoxyethylene sorbitan monopalmitate and polyoxyethylated vegetable oil. From about 0.8 to 1.7 parts of these agents per 100 parts by weight of the polyester polyol may be used. In order to provide improved cell structure in the cellular material, from about 0.3 to 0.6 part per 100 parts by weight of the polyester polyol of a water-soluble organo silicone polymer may be used. These silicones should have a molecular weight of from about 750 to about 1200 and there should, on the average, be about two silicon atoms per polymer molecule. They are condensation products of polyethyleneether glycol and silanes of the structure $R_nSiX_{4-n}$ where R is lower alkyl or phenyl, X is chlorine or bromine, and $n = 2$ or $3$.

The polyisocyanate polyurethane composition stream is prepared by reacting an arylene diisocyanate with a polyester polyol which has been described above. In preparing this composition, the ratio of the total number of isocyanate groups provided by the arylene diisocyanate to the total number of hydroxyl groups provided by the polyester polyol should be about 5:1 to 7:1. This is necessary in order to insure that when this stream is mixed with the polyester polyol stream, there is a sufficient number of free isocyanate groups to react with both the hydroxyl groups and water in said polyester polyol stream. In preparing the polyisocyanate polyurethane composition stream, the arylene diisocyanate is agitated with the polyester polyol in a dry reaction vessel. A slow sweep of dry nitrogen is maintained across the surface of the reaction mixture to minimize contamination by atomspheric moisture. It is preferable to introduce the polyester polyol into the diisocyanate. The reaction is exothermic and it is desirable to have facilities for applying external cooling. The time required will depend inversely on the temperature selected. Generally, about 0.5 to 2 hours at 100° C., or 2 to 6 hours at 80° C. is sufficient. The progress of the reaction can be followed by analysis of the free isocyanate content. At temperatures below 80° C. the reaction time becomes inconveniently long; at temperatures above 100° C., the viscosity of the product increases to an undesirable extent.

Any of a wide variety of arylene diisocyanates can be used. Chlorobenzene - 2,4-diisocyanate, anisole-2,4-diisocyanate, cumene-2,4 - diisocyanate, toluene-2,4-diisocyanate, benzidine diisocyanate, methylenebis(4-phenylisocyanate), methylenebis(3-methyl-4-phenylisocyanate), and m-phenylene diisocyanate are representative examples. Mixtures of these diisocyanates and isomer mixtures may be employed. A mixture of the 2,4- and 2,6-isomers of toluene diisocyanate is preferred in which the ratio of the isomers ranges from about 80:20 to about 65:35.

In carrying out the process of this invention, from about 130 to 200 parts by weight of the polyisocyanate polyurethane composition stream should be employed for each 100 parts by weight of the polyester polyol stream and the ratio of the number of isocyanate groups in said polyisocyanate polyurethane stream to the number of hydroxyl groups in the polyol stream should be at least about 1.25:1. An excess in the number of isocyanate groups is, of course, necessary in order to provide free isocyanate groups for reaction with the water.

As mentioned above, the improvement in the spraying process of the present invention is brought about by the presence of a water-soluble polyacrylamide in the polyester polyol stream. When this process is operated without the use of polyacrylamide, it is not possible to spray overhead or vertical surfaces satisfactorily.

The polyacrylamide may be prepared by the polymerization of acrylamide. It should have a Brookfield viscosity at 25° C. in 10% aqueous solution of about 8000 to 20,000 centipoises.

In carrying out the process of this invention, there should be from about 1.6 to 5.0 parts by weight of polyacrylamide for each 100 parts by weight of the polyester polyol. It is to be understood that slightly more or less additive may be present. However, the newly sprayed material is not as well immobilized when less than the recommended concentration of additive is used; unevenness of the foam surface will begin to be evident. If more than about 5 parts of the additive is employed, the viscosity of the polyester polyol stream will be less convenient for handling at normal operating temperatures and the foam obtained will begin to exhibit a tendency toward warpage.

In a representative operational setup for carrying out the process of this invention, the polyisocyanate polyurethane composition and the polyester polyol are stored in separate tanks 1 and 2; pumps 3 and 4 at the base of these tanks circulate the materials through a heat exchanger 5 and 6 whence they are returned to the tanks. The materials are circulated until the proper temperature is attained. Recycle valves 9 and 10 are then actuated to permit the material to flow through hose lines and return. After the temperature of the hose lines stabilizes, the materials may be pumped through them to the spray gun 15.

The polyisocyanate polyurethane composition and the polyester polyol mixture are separately pumped to the spray gun. The spray gun is served by a plurality of hoses from a manifold. Generally, three hoses are employed; one each for air 16, the polyester polyol stream 17, and the polyisocyanate polyurethane composition stream 18. In a typical setup the hoses have an inner diameter of about a half inch; the manifold contains four-way valves 13 and 14 which permit introduction of cleaning solutions when the spraying operation is finished.

Since the foaming reaction is completed very soon after the mixing of the polyester polyol stream and the polyisocyanate polyurethane composition stream, it is recommended that the foaming be initiated after the reactants have left the spray gun. This can be accomplished by introducing the reactants to the atmosphere through concentric orifices 19 and 20, atomizing them with an enveloping air blast 21 and completing the mixing by means of a ring of air jets 22. Foaming initiates in the atmosphere and is complete within about 5 to 10 seconds.

The spray is applied by moving the spray gun in a sweeping motion in a pattern 3 or 4 feet wide. The spray should be advanced across the surface at the rate of about 3 feet per second. The usual procedure is to coat an area 3 to 4 feet wide and as high as the reach of the operator permits. The air blast from the spray gun does not damage the partially foamed areas. Recoating can proceed as soon as the foam has attained its maximum height (usually about 1 inch). When the operator has finished applying the first layer to the area within his reach, the portions first sprayed are ready for recoating, if desired. In this manner additional layers can be applied to build up the foam thickness. It is recommended that no more material be applied per pass than is necessary to get a foam one inch thick. When thicker foams are attempted with a single pass, the extra heat liberated during the foaming tends to discolor the foams obtained.

Large mold cavities may be filled with the cellular material by spraying the interior with a sweeping motion in the manner indicated above. The amount of material applied per sweep should give a foam about a half inch to an inch in thickness. After each layer has foamed and become tack-free, a new layer may be applied to its surface. Repeated passes can be made with the spray stream until the layers of foam obtained fill the entire mold.

When the spraying operation is complete, the manifold valves 13 and 14 are actuated to permit the cleaning agents to enter the direct hose lines and the spray gun 15. It is recommended that dry methylene chloride be used to flush the gun section and the lines used for the polyester polyol stream. Tricresyl phosphate is recommended for cleaning the lines employed for the polyisocyanate polyurethane composition stream.

The following examples will better illustrate the nature of the present invention; however, the invention is not intended to be limited to these examples. Parts are by weight unless otherwise indicated.

EXAMPLE 1

A. *Preparation of the polyester polyol*

A polyester polyol is formed in the conventional manner by reacting 406 parts of phthalic anhydride and 1790 parts of adipic acid with 3280 parts of trimethylolpropane. It has a hydroxyl number of about 490, an acid number of about 1, and a 0.04% water content.

B. *Preparation of the polyisocyanate polyurethane composition*

2000 parts of the polyester polyol prepared in A above and 8000 parts of a toluene diisocyanate isomer mixture (80% 2,4- and 20% 2,6-) are agitated in a dry reaction vessel (protected from atmospheric water vapor by a slow sweep with dry nitrogen) for 5 hours at 80° C.

C. *Spray application*

(1) A masterbatch is prepared by mixing 60 parts of the polyester polyol of A above, 1 part of water, 1 part of a non-ionic emulsifying agent known as polyoxyethylene sorbitan monopalmitate, 3.1 parts of a 40% by weight aqueous solution of sodium methyl siliconate, 1 part of potassium acetate, 0.5 part of a water-soluble organo silicone polymer having a molecular weight of about 850, 0.5 part of triethylamine, and 1 part of a water-soluble polyacrylamide having a weight average molecular weight of about 650,000. This masterbatch is fed to a spray gun 15 which causes it to be subsequently mixed with the polyisocyanate polyurethane composition prepared in B above. During the spray application the weights of the polyisocyanate polyurethane composition and the masterbatch reacted are in a ratio of about 1:0.6. For each 100 parts of material sprayed, 0.0078 molar part of sodium methyl siliconate, 0.0031 molar part of triethylamine, and 0.625 part of the polyacrylamide are present. The spray gun 15 is capable of mixing two streams of equal volume. All mixing occurs beyond the gun. The streams are introduced to the atmosphere through separate concentric orifices 19 and 20, atomized with an enveloping air blast from 21, and mixed by means of a ring of air jets from 22. The polyester polyol stream emerges from the spray gun from a center orifice 19; the polyisocyanate polyurethane stream emerges from a concentric orifice 20 adjacent to the center orifice. An air blast from an outer concentric orifice 21 atomizes the emerging streams by creating areas of varying air density. A ring of air jets 22 about this outer orifice completes the mixing Vertical and overhead surfaces are sprayed by advancing the spray gun at a rate of 3 feet per second across the surface. The foam rises and cures to a smooth regular tack-free surface within 30 seconds of application. The adhesion is excellent. The foam layer is about 1 inch thick and has a density of about 2 pounds per cubic foot.

(2) The procedure of (1) above is repeated except that the potassium acetate and the water-soluble organo silicone polymer are omitted. Similar results are obtained.

EXAMPLE 2

A. *Preparation of the polyester polyol and the polyisocyanate polyurethane composition*

The polyester polyol and the polyisocyanate polyurethane composition are prepared by the procedures described in Example 1, Parts A and B, respectively.

B. *Spray application*

A masterbatch is prepared by mixing 60 parts of the polyester polyol, 1 part of water, 1 part of a non-ionic emulsifying agent known as polyoxyethylene sorbitan monopalmitate, 3.1 parts of a 40% by weight aqueous solution of sodium methyl siliconate, 0.5 part of a water-soluble organo silicone polymer having a molecular weight of about 850, 0.25 part of dimethylethanolamine, and 1 part of a water-soluble polyacrylamide having a weight average molecular weight of about 650,000. This masterbatch is fed to a spray gun which causes it to be subsequently mixed with the polyisocyanate polyurethane composition. These components are reacted in a weight ratio of about 1:0.6 during the spray application. Vertical and overhead surfaces are sprayed by advancing the spray gun at a rate of 3 feet per second across the surface. A smooth, regular, tack-free cellular layer is formed within 30 seconds of the application. The density of the foam is about 1 pound per cubic foot.

As many widely different embodiments of this invention may be made without departing from the spirit and scope thereof, it is to be understood that this invention is not limited to the specific embodiments thereof except as defined in the appended claims.

What is claimed is:

1. In the process of forming a cellular polyurethane structure on a surface by spraying separate streams of ingredients, which are mixed after leaving their respective orifices, said streams being (1) a stream comprising 100 parts by weight of a fluid polyester polyol having at least one hydroxyl group as a cross-linking site for each 400 units of molecular weight of said polyester, 4.1 to 5.8 weight parts of water, and 1.6 to 3.4 weight parts of a basic catalyst, said catalyst being selected from the group consisting of a tri lower alkyl amine, a mixture comprising said tri lower alkyl amine and sodium methyl siliconate, and a mixture comprising an amine of the structure, $R_2R'N$, wherein R is a lower alkyl radical and R' is lower alkyl radical substituted by a hydroxyl group, and sodium methyl siliconate; and (2) a stream comprising a polyisocyanate polyurethane composition made by reacting an arylene diisocyanate with a polyester polyol having at least one hydroxyl group as a cross-linking site for each 400 units of molecular weight of polyester, in relative amounts such that the number of isocyanate groups to the number of hydroxyl groups is in a ratio of about 5:1 to 7:1; with about 130 to 200 weight parts of said polyisocyanate polyurethane composition stream (2) being employed for each 100 parts by weight of said polyester polyol stream (1), with the proviso that the ratio of the number of isocyanate groups in said polyisocyanate stream to the number of hydroxyl groups in said polyester polyol stream is at least 1.25:1; the improvement which comprises introducing into said polyester polyol stream from 1.6 to 5.0 parts of a polyacrylamide having a Brookfield viscosity at 25° C. in 10% aqueous solution of 8000 to 20,000 centipoises.

2. A process according to claim 1 wherein the polyester polyol in stream (1) is prepared from phthalic anhydride, adipic acid and trimethylolpropane.

3. A process according to claim 2 wherein the basic catalyst in stream (1) is a mixture of triethylamine and sodium methyl siliconate.

4. A process according to claim 1 wherein the polyisocyanate polyurethane composition stream (2) is obtained by reacting a polyester polyol, prepared from phthalic anhydride, adipic acid and trimethylolpropane, with an isomeric mixture of 2,4- and 2,6-toluene diisocyanate.

References Cited in the file of this patent
UNITED STATES PATENTS

| | | |
|---|---|---|
| 2,495,540 | Nichols et al. | Jan. 24, 1950 |
| 2,642,403 | Simon et al. | June 16, 1953 |
| 2,666,719 | Lissant | Jan. 19, 1954 |
| 2,764,565 | Hoppe et al. | Sept. 25, 1956 |
| 2,779,689 | Reis | Jan. 29, 1957 |
| 2,786,716 | Peeps | Mar. 26, 1957 |
| 2,787,601 | Detrick | Apr. 2, 1957 |
| 2,788,332 | Muller et al. | Apr. 9, 1957 |
| 2,811,493 | Simon et al. | Oct. 29, 1957 |
| 2,907,671 | Duvivier | Oct. 6, 1959 |